TELEPHONE BOOTH INSTALLATION TOOL

Filed July 19, 1967 3 Sheets-Sheet 1

Sept. 2, 1969 K. L. RASMUSSEN 3,464,670

TELEPHONE BOOTH INSTALLATION TOOL

Filed July 19, 1967 3 Sheets-Sheet 2

Sept. 2, 1969 K. L. RASMUSSEN 3,464,670

TELEPHONE BOOTH INSTALLATION TOOL

Filed July 19, 1967 3 Sheets-Sheet 3

United States Patent Office 3,464,670

Patented Sept. 2, 1969

3,464,670

TELEPHONE BOOTH INSTALLATION TOOL

Kenneth L. Rasmussen, 221 Pestana Ave., Santa Cruz, Calif. 95060

Filed July 19, 1967, Ser. No. 654,518
Int. Cl. B66f 7/14
U.S. Cl. 254—92 9 Claims

ABSTRACT OF THE DISCLOSURE

A telephone booth installation tool which enables one man to raise the walls of a telephone booth to a desired spacing between the bottom of the walls and the ground. The tool comprises a pair of arms, one long and one short, arranged in spaced parallel relationship and connected together by a hinged cross arm. The four ends of the two spaced arms contain raising feet which are adapted to be slid under the walls of the telephone booth. Each raising foot has associated with it a leveling bolt so that each corner of the telephone booth can be selectively raised to a desired height. The right arm of the tool is shorter than the left arm so as not to be interfered with by the telephone booth door when it is in its open position. In operation, the hinged cross arm of the tool is opened so that the tool may be placed on the ground inside the telephone booth. The cross arm is then snapped into its extended position so that the four raising feet slide under the walls of the telephone booth. The walls of the booth are then raised to their desired height by the leveling bolts and secured in place.

Background of the invention

*Field of the invention.*—This invention resides in the field of mechanical tools and more specifically relates to a tool which facilitates the installation of the common telephone booth.

*Brief description of the prior art.*—As is readily apparent, every day there are more and more public telephones and telephone booths appearing on the streets and highways of the country and in public buildings. It has been the experience of those who install such telephone booths that at least two men are required to do the job and the job requires at least an hour's time. One of the reasons for this seemingly long time and effort is the common requirement, especially in the case of outdoor telephone booths, that a certain spacing exists between the bottom of the walls of the telephone booth and the ground or base portion of the booth. This spacing, which is usually around one and one-half inches, is desired to facilitate cleaning of the interior of the telephone booth and to keep trash and dirt from accumulating therein. For this reason, most telephone booths come equipped with anchoring feet which have arms that extend up into the corner posts of the telephone booth. The corner posts, and therefore the walls of the telephone booth that they carry, can be moved upward and clamped into place at the desired height by tightening bolts which extend through the corner posts and contact the upwardly extending arms.

The normal method of raising the walls of the telephone booth to the desired height usually involves one man prying the telephone booth upward while the other man tightens the necessary bolts. This method involves problems, merely from the fact that the telephone booth is heavy and the space within the telephone booth is very cramped. Additionally, it is desirable that the telephone booth be plumb, so that the door may swing open and shut freely and so that the booth will have an aesthetic appearance. This means that one of the men must also operate a level on each vertical wall of the booth after each adjustment of height has been made. It is obvious that if there is any slope or irregularity in the surface upon which the booth is to be installed, or if corrosion has locked the corner posts to the adjusting arms, the job of adjusting the height of the walls of the booth and bringing the booth into plumb is made even more difficult. It has been the experience that in even normal cases the procedure of prying the walls of the booth upward and tightening the bolts has to be repeated several times for each side of the booth befor the desired height is reached and the booth is in plumb. It would be desirable to reduce the time and effort required to install a telephone booth.

It is, therefore, a primary object of this invention to provide a means whereby the job of installing a telephone booth is made much easier than heretofore.

It is a more specific object of this invention to devise a telephone booth installation tool whereby one man can raise the walls of a telephone booth to a desired height and to plumb the telephone booth.

It is a still furthetr object of this invention to provide a telephone booth installation tool for raising and plumbing the walls of a telephone booth in a significantly reduced amount of time.

Summary of the invention

The objects of this invention are obtained by the provision of a telephone booth installation tool which comprises a pair of spaced arm members and a connecting cross-arm member, the arm members including a raising foot member at each end thereof which can be slid under the walls of the booth and individually raised to desired heights by respective leveling bolts. The cross-arm of the tool is hinged so that the tool can be inserted in the booth and placed on the ground; then the hinge is snapped shut to slide the raising foot members under the walls of the booth. It is preferable to make one of the arms shorter than the other arm so as not to interfere with the door of the telephone booth.

While the invention is distinctly pointed out and described in the appended claims, the operation of the tool in a specific embodiment may be better understood with reference to the following detailed description taken in conjunction with the accompanying drawings.

Detailed description of the preferred embodiment

Figure 1:
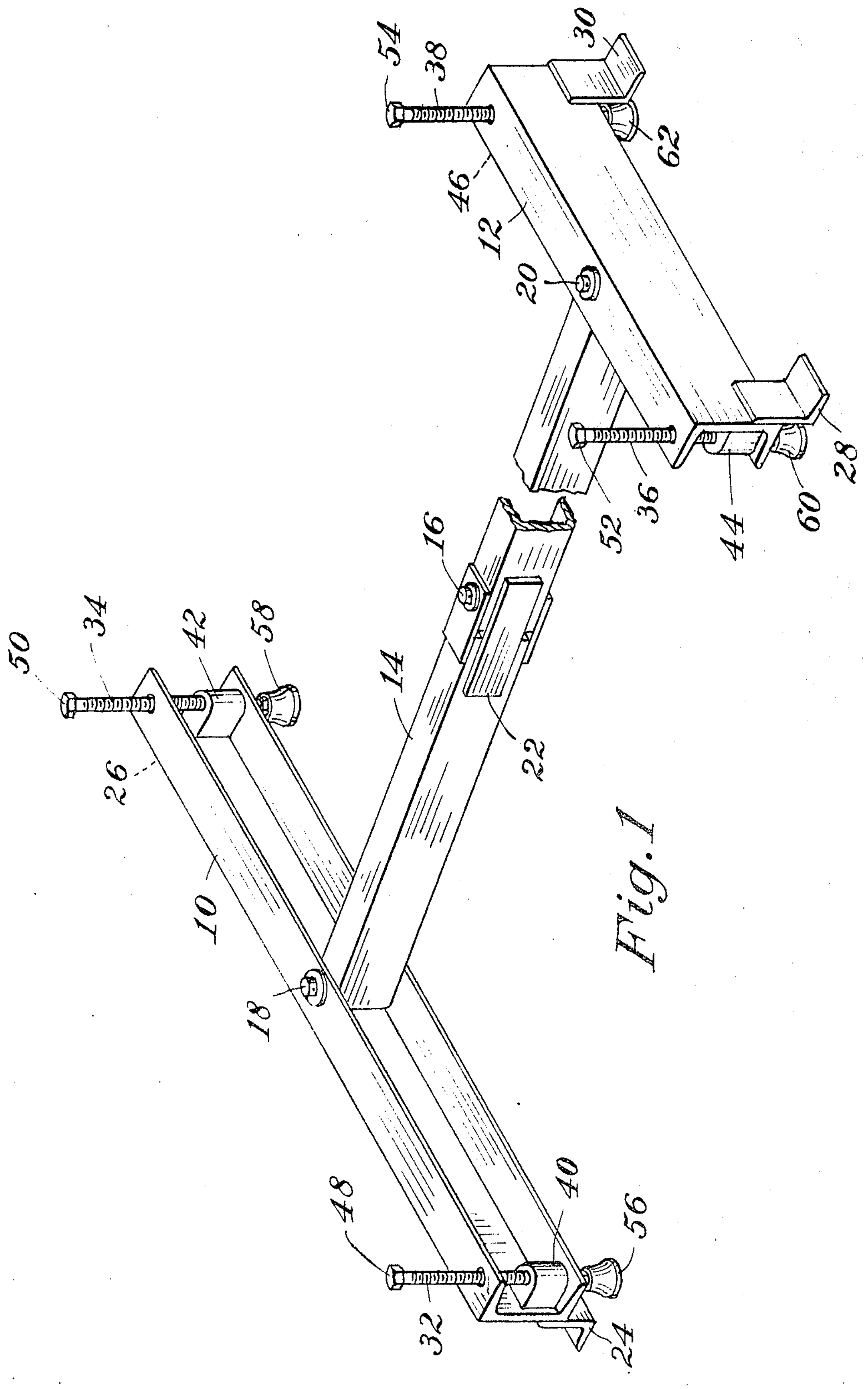
FIG. 1 is a view in perspective of a telephone booth installation tool according to this invention.

Referring to FIG. 1, the telephone booth installation tool according to one specific embodiment of this invention is shown in perspective, and it is apparent that the general appearance of the tool is that of the letter H. The tool comprises a pair of spaced parallel arms 10 and 12 respectively, which may be channel members as shown. The right arm 12 is shown shorter than the left arm 10 for reasons which will become apparent. The two arms are connected together by a cross arm member 14 which is hinged near its center and is pivotally secured at its ends near the centers of the arms 10 and 12. The hinge and the left and right pivots for the cross arm member 14 are represented by the reference numerals 16, 18 and 20, respectively. It will be appreciated that the hinge 16 permits the cross arm 14 to be broken down to an angular position and this, together with the action of the pivots 18 and 20, permits the two arms 10 and 12 to remain in a substantially parallel relationship but with a closer spacing between them. A plate 22 is shown welded across the hinge portion of the cross arm 14 and on one side thereof to impede the cross arm from breaking in the opposite direction once it has been snapped to its fully extended position. The cross arm 14 may also comprise a channel member just as the arms 10 and 12.

Each extreme end of the arms 10 and 12 has welded thereto one of the outwardly extending angular foot members 24–30 respectively (the rear foot member for the arm 10 being hidden in FIG. 1). The foot members 24–30 are positioned such that a lower horizontal portion thereof extends outwardly from the arms 10 and 12 and is lower relatively to the lower portion of the arms 10 and 12. The tool is completed by the provision of four leveling bolts 32–38 and their respective mounting brackets 40–46 provided at each end of both of the arms 10 and 12 respectively (the mounting bracket 46 being hidden in FIG. 1). Each of the leveling bolts extends down through the respective ends of the arm members 10 and 12 and the bolts are respectively provided with hex heads 48–54 on their tops and base members 56–62 on their bottoms. The exteriors of the leveling bolts 32–38 and the interiors of the mounting brackets 40–46 are threaded so that as the bolts are turned, such as by applying torque to the hex heads 48–54 by a wrench, the ends of the mounting arms 10 and 12 can be raised or lowered.

Figure 2:
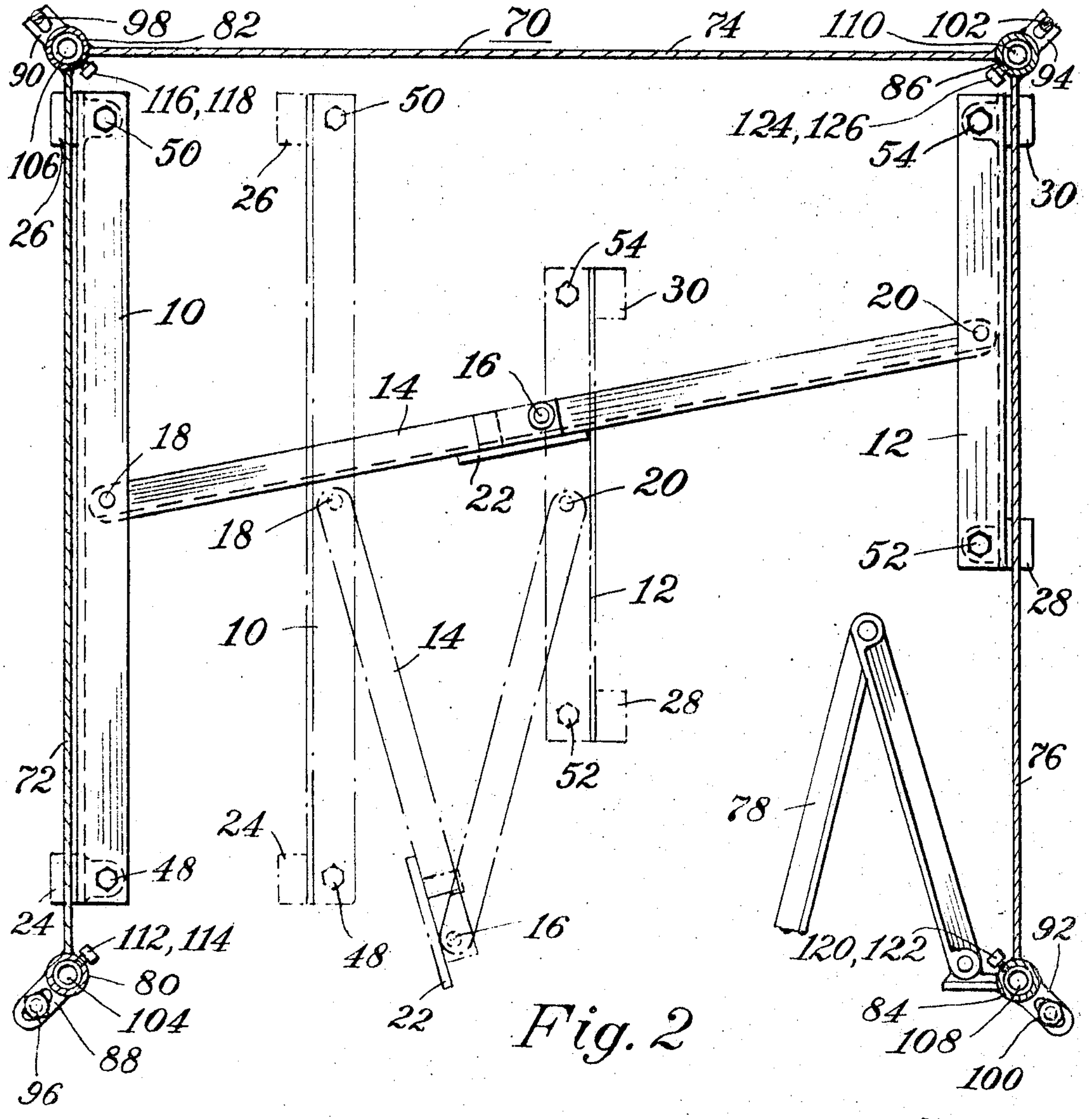
FIG. 2 is a sectional plan view of a telephone booth with the telephone booth installation tool shown in place in both its open and closed positions.

In FIG. 2, the telephone booth installation tool is shown positioned within a telephone booth 70, the tool being shown in both its open (phantom lines) and its closed (solid lines) positions. As is apparent in FIG. 2, the telephone booth 70 comprises three walls 72–76 and a door 78 which folds open inwardly from the right front corner of the telephone booth. The three walls and the door of the telephone booth 70 are assembled together by means of four corner posts 80–86 which may comprise hollow vertically extending tubes. The telephone booth 70 is fastened to the ground or some other sort of supporting base by means of slotted mounting foot members 88–94 and anchor bolts 96–102 positioned in the slots of the mounting foot members. Each of the slotted mounting foot members 88–94 has welded to it an upwardly extending arm 104–110 positioned within the hollow interior of the corner posts 80–86 and which may itself comprise a hollow cylindrical sleeve. The walls of the telephone booth together with the corner posts may be raised or lowered relatively with respect to the upwardly extending arms 104–110 and then clamped at a desired height by tightening a pair of bolts 112–126 provided in each corner post respectively and positioned to extend through the walls thereof and in contact with the upwardly extending arms 104–110.

In operation, the tool is positioned within the telephone booth 70 in the position as shown in FIG. 2 in phantom line and then the hinged portion of the cross arm 14 is snapped shut to cause the raising foot members 24–30 to move outward and under the walls 72 and 76 of the telephone booth. It will be appreciated that in the embodiment illustrated in FIG. 2, if the bottom of the walls of the telephone booth are flush with or higher than the bottom of the corner posts, a slight spacing will exist between the bottom of the walls and the ground, the spacing being equal to the thickness of the slotted mounting foot members 88–94. The existence of this space, which may be as small as ⅛ inch, facilitates the action of the raising foot members 24–30 to be slide underneath the walls 72 and 76. It will be apparent that in this embodiment the lower horiontal portions of the raising foot members 24–30 must also be as small or smaller than ⅛ inch.

It will be appreciated that other types of anchoring means may be utilized other than the mounting foot members illustrated in FIG. 2 which may or may not leave an initial small spacing under the walls of the telephone booth. In such cases where no spacing exists, the raising foot members may be slipped under the bottom of the booth very simply by rocking the booth slightly while applying pressure to the cross arm 14 until it has snapped into its extended position.

As mentioned previously, the right arm 12 of the tool is made shorter than the left arm 10; this is to permit the tool to be extended without contacting the inwardly extending open door 78. It will be appreciated that the arms 10 and 12 can be made any desirable length or can be made adjustable to accommodate the different sizes of telephone booths that may be encountered. In cases where different types of mounting foot members may be utilized that may take up more space than those illustrated in FIG. 2, the arms can be made shorter in order that the raising foot members on each respective arm can fit within the space allowed between the mounting foot members utilized. For these reasons, the relative lengths of the mounting arms required for the various types and sizes of telephone booths encountered should in no way affect the scope of the present invention.

Figure 3:
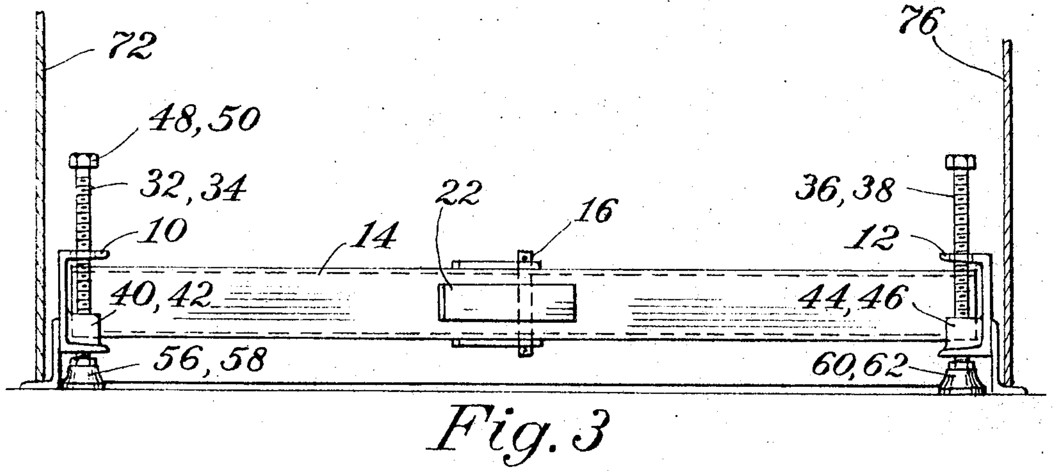
FIG. 3 is a sectional side view of FIG. 2.

Referring to FIG. 3, a sectional side elevation view of the telephone booth is illustrated with the tool in its extended position. By turning the leveling bolts 32–38, by means of a wrench or otherwise, the front and back portions and the left and right sides of the telephone booth walls can be individually raised to any desired height. On a level surface, each of the leveling bolts could be turned until the raising foot members 24–30 have raised the walls such that a 1½ inch spacing exists all around the telephone booth. If, on the other hand, the booth is to be installed on a sloping surface, in order to keep the booth in plumb, the downside leveling bolts can be adjusted for a greater spacing than the upside bolts. Each of the leveling bolts can be adjusted individually and in succession and the whole operation of raising the booth to its desired height can be performed very quickly by a single person. After the booth 70 has been raised to its desired height, the clamping bolts 112–126 are tightened and the telephone booth is completely installed.

Figures 4, 5:
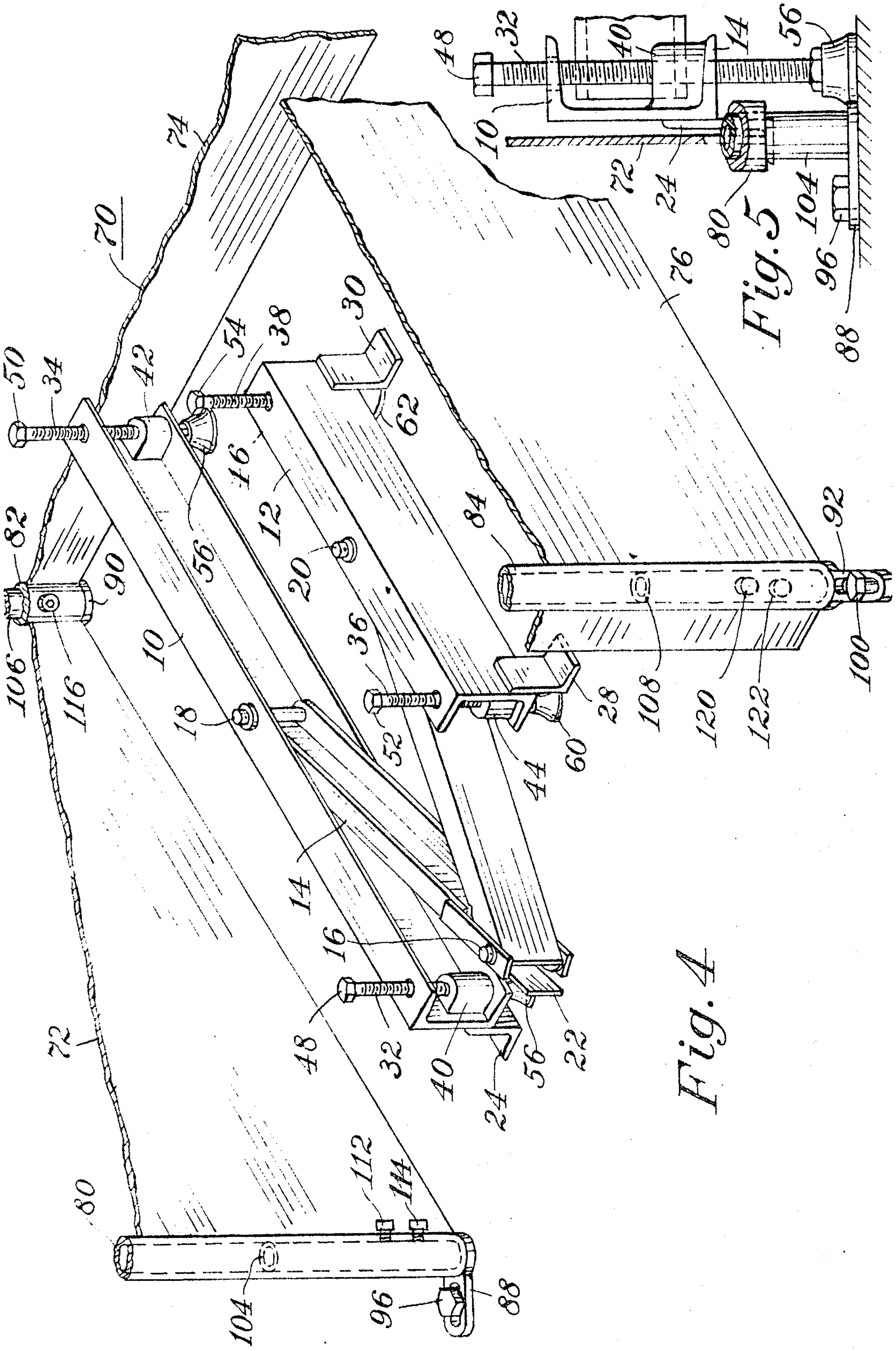
FIG. 4 is a perspective view of a telephone booth with the telephone booth installation tool shown collapsed and positioned therein.
FIG. 5 is a detailed view of a portion of the tool and booth after the tool has been extended and after the sides of the telephone booth have been raised.

FIG. 4 shows a perspective view of the interior of a telephone booth 70 before it has been raised and with the telephone booth installation tool inserted therein in its collapsed position. It is apparent from FIG. 4 that access to the interior of the telephone booth to permit insertion of the tool in order to effect its operation in raising the telephone booth is readily obtained.

FIG. 5 shows in detail one of the leveling bolts 32 and its raising foot member 24 after the tool has been extended so that the raising foot member 24 is directly beneath one wall 72 of the booth, and after the leveling bolt 32 has been adjusted to raise the wall 72 to its desired height.

It is apparent from this description and the figures that throughout the entire operation, there is minimal contact between the tool and the telephone booth, which minimizes the possibilities of damage to the booth which otherwise may be encountered if a pry bar or other similar technique is used. Additionally, since only one man is performing the job and since the tool itself, rather than the man, performs the function of carrying the weight of the telephone booth during the raising process, the possibility of physical harm to the man installing the booth is also minimized.

It is, therefore, apparent from this description that the objects of the invention are obtained in the telephone booth installation tool disclosed. Although a preferred embodiment of the invention has been described and its operation in connection with a specific type of telephone booth, it is to be understood that the invention is not limited to the specific examples disclosed and that changes and modifications may be made without departing from the spirit and scope of the invention as set forth in the appended claims.

What is claimed is:

1. A telephone booth installation tool for raising the walls of a telephone booth to desired heights above a base after the booth has been positioned thereon and secured thereto comprising:

first and second arm members arranged in spaced relationship with respect to each other, means connecting said first and second arm members, said means adapted to vary the spacing between said arm members, a plurality of foot members, at least one of which is respectively connected adjacent each end of said first and second arm members, said foot members being positioned and constructed so as to slide under the walls of the telephone booth when said tool is placed inside the booth and the spacing between said first and second arm members is increased by adjustment of said connecting means, and means for individually raising each of said foot members desired amounts to raise the walls of the booth to the desired heights after said foot members have been slid thereunder.

2. A telephone booth installation tool according to claim 1 wherein one of said first and second arm members is shorter than the other so as to allow operation of said tool inside the telephone booth without being impeded by the door thereof.

3. A telephone booth installation tool according to claim 1 wherein said first and second arm members comprise channel members.

4. A telephone booth installation tool according to claim 1 wherein said means for varying the spacing between said first and second arm members comprises a hinged connection included in said connecting means.

5. A telephone booth installation tool according to claim 1 wherein said means connecting said first and second arm members comprises a hinged channel member.

6. A telephone booth installation tool according to claim 5 wherein said first and second arm members are pivotally connected to said connecting means such that they may remain in substantially parallel relationship as the spacing therebetween is varied.

7. A telephone booth installation tool according to claim 1 wherein said foot members comprise angle members, said angle members being connected to said first and second arm members so that there exists on each angle member a lower horizontal outwardly extending portion.

8. A telephone booth installation tool according to claim 1 wherein said means for individually raising each of said foot members comprises a leveling bolt associated with each end of said first and second arm members, each of said leveling bolts being adapted to raise or lower its respective end of said first and second arm members.

9. A telephone booth installation tool for raising the walls of a telephone booth to desired heights above a base after the booth has been positioned thereon and secured thereto, the booth being of the type that prior to the walls being raised to the desired heights, a slight spacing smaller than the desired height exists between the walls and the base comprising:

first and second arm members arranged in spaced parallel relationship with respect to each other, one of said first and second arm members being shorter than the other, a hinged connecting arm, the extreme ends of which are pivotally respectively connected intermediate said first and second arm members, said connecting arm having a hinged portion and being adapted to vary the spacing between said first and second arms by opening and closing its hinged portion, a plurality of angle members, each respectively connected to each end of said first and second arm members, said angle members arranged with a lower horizontally outwardly extending portion of thickness at least as small as the slight spacing existing between the walls and base of the booth prior to the walls being raised to their desired heights, and a plurality of raising bolt members, each respectively associated with each end of said first and second arm members and their respective raising foot members and adapted to raise or lower said foot members desired amounts, so that by placing said tool within the telephone booth and on the base member with the hinged portion of said connecting arm being opened and by then closing the hinged portion of said connecting arm to force said foot members under the walls of the telephone booth, the shorter of said first and second arms being positioned adjacent the door of said telephone booth, the walls of the booth may be raised to desired height by selective adjustment of said leveling bolts.

References Cited

UNITED STATES PATENTS

| | | | |
|---|---|---|---|
| 2,865,585 | 12/1958 | Beyer | 254—100 X |
| 2,937,850 | 5/1960 | Winkler | 254—8.2 |
| 3,289,868 | 12/1966 | Miller | 254—89 X |

ROBERT C. RIORDON, Primary Examiner

D. R. MELTON, Assistant Examiner

U.S. Cl. X.R.

52—122